Patented Feb. 7, 1950

2,496,550

UNITED STATES PATENT OFFICE 2,496,550

METHODS OF RECOVERING CHEMICALS IN THE MANUFACTURE OF CELLULOSE BY DIGESTION ACCORDING TO THE ALKALINE SULFITE AND/OR ALKALINE BISULFITE METHODS

Eric Johan Larsson and John Harald Jonsson, Harnas, Sweden, assignors to Stora Kopparbergs Bergslags Aktiebolag, Falun, Sweden, a corporation of Sweden No Drawing. Application July 6, 1948, Serial No. 37,322. In Sweden July 24, 1947

6 Claims. (Cl. 23—64)

It has been known since long ago that cellulose manufactured by digestion of wood with alkaline sulphites or alkaline bisulphites, such as sodium sulphite or sodium bisulphite, possesses qualities superior to those obtainable by digestion with calcium bisulphite. On account of the high price of the alkali, however, a nearly complete recovery of the same is a compelling necessity to render the alkali sulphite and the alkali bisulphite methods competitive with the calcium bisulphite method. There are a number of patents referring to various methods of carrying this recovery into effect. However, none of these methods appears to have come into use in practical operation. The reason for this is believed to reside in that none of the methods in consideration can be regarded as answering the demands for economy and a high degree of recovery.

Now, the present invention relates to a method of economical and advantageous recovery of chemicals in the manufacture of cellulose by the digestion of wood according to the alkali sulphite and/or alkali bisulphite methods. The novel method is principally distinguished by the feature that the molten mass of salt obtained by evaporation and combustion of the waste-liquid is dissolved in a suitable solvent, such as water and/or condensate from the washing of gases emanating from soda furnaces and/or mother-liquor obtained in the operation of the present method, whereupon carbonic acid is introduced in one or more steps, in a manner such that the carbonisation in this first step or these first steps is carried to a point near the limit of solubility of the bicarbonate or slightly beyond said point, the carbonisation being then continued in subsequent steps till the point of crystallisation of bicarbonate. Preferably, heating of the solution for the expulsion of hydrogen sulphide is intervened between the first carbonisation step or steps and the final carbonisation. This expulsion is advantageously undertaken in vacuum of approximately 600 mm. Hg. Said hydrogen sulphide is collected and combusted into sulphur dioxide, which may then be used, together with bicarbonate obtained according to the present method, for the preparation of new digestion liquor. The carbonic acid thus liberated is preferably used for the carbonisation of further quantities of a dissolved molten mass of salt.

To prevent concentration of inactive salts, such as thiosulphate and sulphate, in the system, a suitable quantity of mother-liquor obtained from the last step of treatment, that is to say, upon the crystallisation of the bicarbonate, is shunted off and supplied to the preferably concentrated liquor to be burned.

The silicic acid originating from the wood ashes or from elsewhere is precipitated in the first carbonisation step or steps, and is removed prior to the crystallisation, for instance by filtering or in some other way.

The present invention will be further explained hereinbelow in connection with sodium bisulphite digestion.

The molten mass of salt obtained in the burning of the preferably concentrated liquor and consisting substantially of sodium carbonate and sodium sulphide is dissolved in water and/or condensate from the washing of gasses emanating from one or more soda furnaces, or in mother-liquor obtained in the final carbonisation, whereupon it is clarified in any suitable manner for the removal of mechanical impurities. The clarified solution is then treated with carbonic acid gas under pressure (the so-called carbonisation) in one or more steps, in a manner such that the carbonisation is carried here to a point near the limit of solubility of the bicarbonate. The bicarbonate thus formed is then caused to react with the sodium sulphide in the solution (the hydrosulphide) by the solution being heated. Hydrogen sulphide is thus formed, which is then expelled i. e., stripped off, by heating in vacuum. The final carbonisation and crystallisation of the bicarbonate are then carried into effect in the following steps. The reaction in the process may be illustrated schematically by the following formulae:

1. Dissolving of the molten mass:

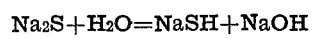

2. Carbonisation in step I:

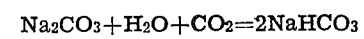

3. Expulsion i. e., stripping off, of hydrogen sulphide:

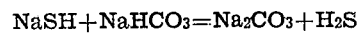

4. Final carbonisation and crystallisation:

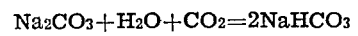

Further digesting liquor is prepared from the quantity of sodium bicarbonate obtained by treatment with an acid such as $SO_2$, $CO_2$ being thus liberated. The carbon dioxide gas is preferably introduced again into the system to be used for the carbonisation of further quantities of molten salt.

The mother-liquor obtained upon the separation of the bicarbonate crystals may be used for the neutralisation of liquor intended to be used for fermentation, for instance for fermentation of spirit. A portion of the mother-liquor may also be supplied to the residuum obtained in the manufacture of spirit. Furthermore, it may, as already stated, be used as a solvent for the molten mass of salt. The two first-mentioned measures are of a certain importance, as it will be possible by the same to prevent or avoid a concentration of inactive salts, such as thiosulphate and sulphate, in the system, by this liquor being combusted upon evaporation.

The advantages of the present method in comparison with previous proposals are, above all, that the consumption of carbonic acid in the carbonisation will be of a reasonable magnitude, and that the hydrogen sulphide is brought to a high degree of concentration, so as to permit of being readily taken care of.

If the carbonisation and the crystallisation of the bicarbonate are undertaken in one and the same step, very large quantities of carbonic acid are required for the expulsion of the hydrogen sulphide, whereby the latter will be diluted with carbonic acid and difficult to take care of. Furthermore, the precipitated silicic acid will in this case stick to the bicarbonate crystals so as to become concentrated in the system. This rapidly leads to an inferior quality of the manufactured cellulose and to clogging of the apparatus.

What we claim is:

1. In a process for the recovery of the alkali salts from the waste liquors from the production of cellulose by the digestion of the wood with an alkali salt selected from the group consisting of alkali sulphites and alkali bisulphites, the steps which comprise evaporating and burning said waste liquor to form a molten mass containing alkali and sulphur compounds, dissolving said molten mass in a solvent, introducing carbon dioxide into the solution thus formed and thereby forming alkali bicarbonate, the addition of carbon dioxide being continued until the bicarbonate formed is near its limit of solubility, heating said solution to eliminate hydrogen sulphide formed therein, introducing additional carbon dioxide into said solution whereby alkali bicarbonate is crystallized therefrom, and subsequently separating the crystallized alkali bicarbonate from said solution.

2. A process as set forth in claim 1 wherein said solvent for said molten mass is an aqueous medium.

3. A method as set forth in claim 1 wherein a portion of the solution remaining after the separation of said crystallized alkali bicarbonate is employed as the solvent.

4. A process as set forth in claim 1 wherein a portion of the solution remaining after the separation of said crystallized alkali bicarbonate is added to the waste liquor before the burning of the same to form a molten mass.

5. A process as set forth in claim 1 wherein said eliminated hydrogen sulphide is burned to produce sulphur dioxide and said sulphur dioxide is added to said crystallized alkali bicarbonate to form alkali sulphites and alkali bisulphites for further use in the digestion of wood for the production of cellulose.

6. The process as set forth in claim 1 wherein silicic acid formed is removed by filtering the alkali bicarbonate solution prior to the precipitation of crystallized alkali bicarbonate by the further addition of carbon dioxide.

ERIC JOHAN LARSSON.
JOHN HARALD JONSSON.

REFERENCES CITED

The following references are of record in the file of this patent:

UNITED STATES PATENTS

| Number | Name | Date |
|---|---|---|
| Re. 19,240 | Goodell | July 17, 1934 |
| 620,755 | Drewson | Mar. 7, 1899 |
| 1,605,927 | Drewson | Nov. 9, 1926 |
| 1,702,588 | Bradley | Feb. 19, 1929 |
| 1,728,252 | Rawling | Sept. 17, 1929 |
| 1,997,773 | Haglund | Apr. 16, 1935 |